U. G. SMITH.
AUTOMATIC STOCK TANK AND HEATER.
APPLICATION FILED AUG. 12, 1910.
982,101.
Patented Jan. 17, 1911.
2 SHEETS—SHEET 1.
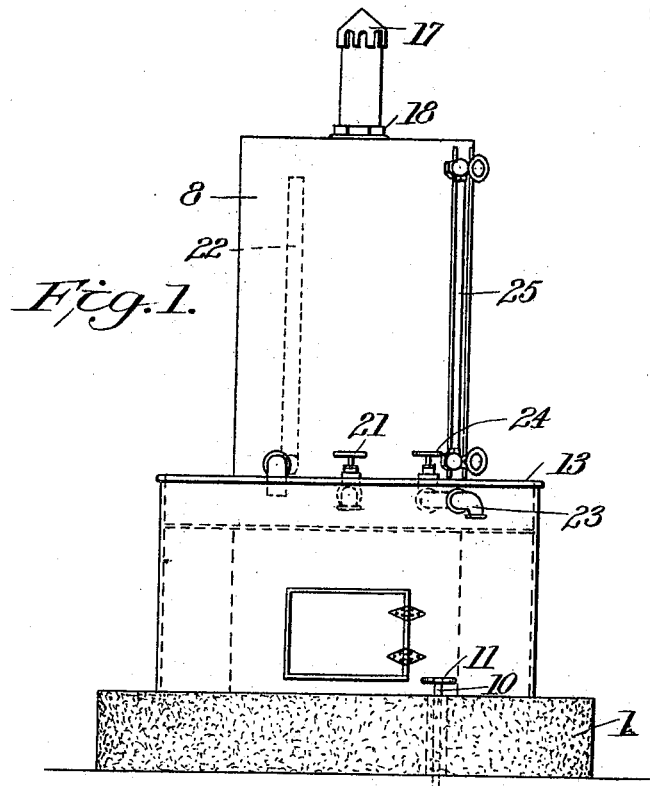
Fig. 1.
Fig. 3.
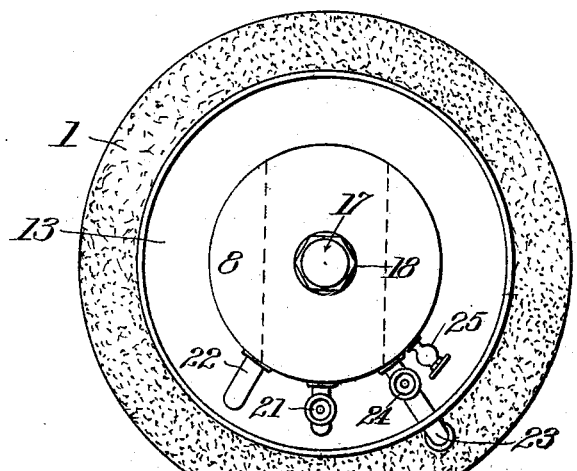
Witnesses
Inventor
Ulysses G. Smith,
By Eden Bro's,
Attorneys

U. G. SMITH.
AUTOMATIC STOCK TANK AND HEATER.
APPLICATION FILED AUG. 12, 1910.

982,101.

Patented Jan. 17, 1911.
2 SHEETS—SHEET 2.

Witnesses
C. N. Walker.
Ernest P. Hutchinson.

Inventor
Ulysse G. Smith,
By Edson Bros.
Attorneys

THE NORRIS PETERS CO., WASHINGTON, D. C.

UNITED STATES PATENT OFFICE.

ULYSUS G. SMITH, OF FAYETTE, OHIO.

AUTOMATIC STOCK-TANK AND HEATER.

982,101. Specification of Letters Patent. Patented Jan. 17, 1911.

Application filed August 12, 1910. Serial No. 576,832.

*To all whom it may concern:*

Be it known that I, ULYSUS G. SMITH, a citizen of the United States, residing at Fayette, in the county of Fulton and State of Ohio, have invented certain new and useful Improvements in Automatic Stock-Tanks and Heaters; and I do hereby declare the following to be a full, clear, and exact description of the invention, such as will enable others skilled in the art to which it appertains to make and use the same.

My invention relates to an automatic watering apparatus for stock.

It is my object to provide a tank of this kind containing a heater which will keep the water in the tank and trough of uniform temperature and which is so constructed that the supply pipes and valves therein cannot freeze up and interfere with the proper working of the apparatus.

Further objects are to utilize the heat to the best advantage and to so distribute it that the flames from the burner cannot possibly reach to the outside of the tank whereby there is no danger of a fire being started by the apparatus, even when it is located in a barn or shed near straw or haystacks.

It is also my aim to provide a tank which is absolutely tight whereby no dust, disease germs or other foreign substances can enter it. Furthermore, the water is aerated so that it cannot become foul or stagnant.

The apparatus, as a whole, is compact, simple in construction and easy to operate.

The invention consists in the features of construction and combinations of parts hereinafter described and specified in the claims.

Figure 2:
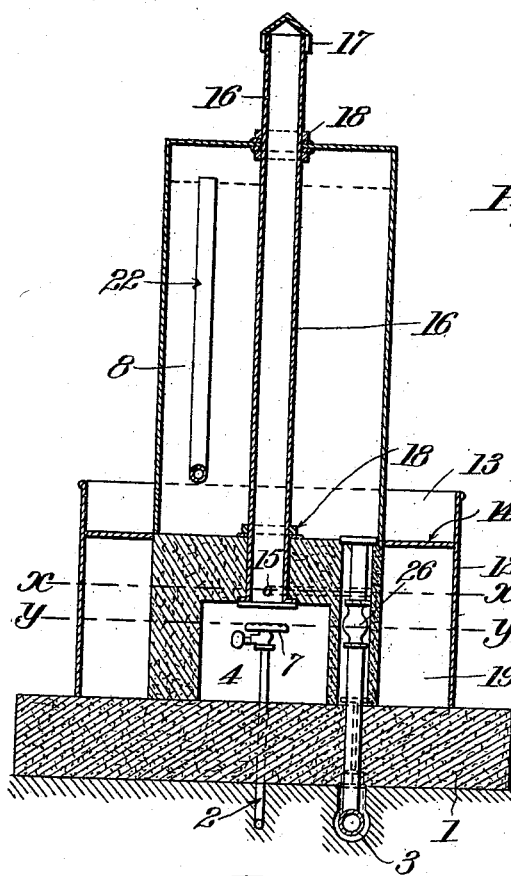
Figure 5:
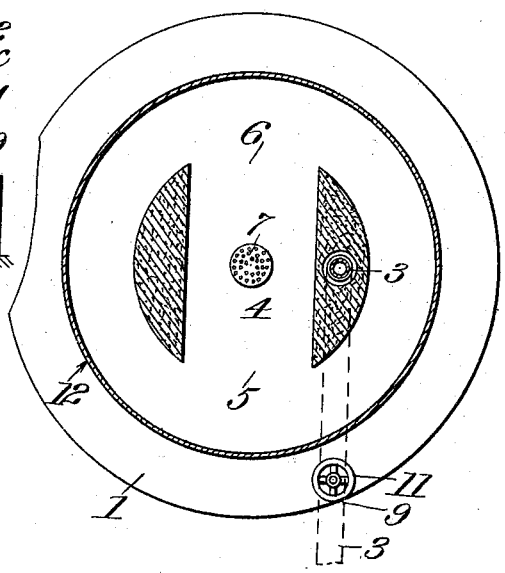
Figure 4:
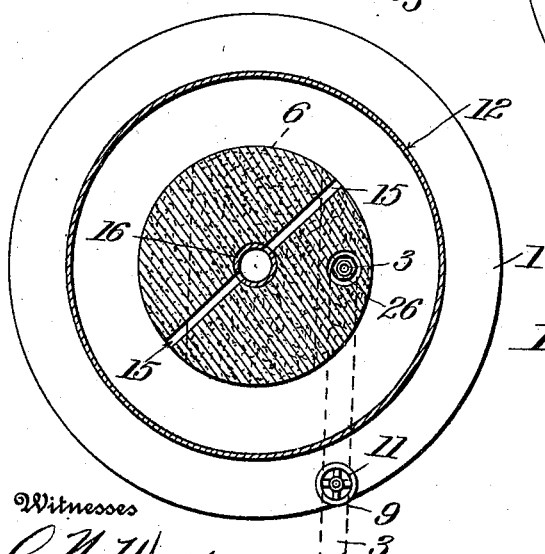

In the accompanying drawings illustrating the preferred embodiment of my invention: Figure 1 is a front elevation of the combined tank, trough and heater. Fig. 2 is a central vertical sectional view thereof. Fig. 3 is a plan view. Fig. 4 is a sectional view on the line x—x of Fig. 2, and Fig. 5 is a sectional view on the line y—y of Fig. 2.

I preferably build my watering apparatus upon a foundation of concrete 1 through which the gas pipe 2 and water supply pipe 3 extend. Upon this foundation, I construct a concrete oven or heating chamber 4 having openings 5 and 6 at the front and rear thereof. The gas pipe extends up through the center of the floor of this chamber and is equipped with a suitable burner tip 7 from which the flame acts directly upon the cover or roof of said chamber. The water supply pipe 3 extends up through one of the side walls of the heating chamber and delivers the water into the tank 8 superposed upon said chamber. Said water supply pipe is provided with a hand valve 9 arranged below the foundation 1 and from which an operating shaft 10, equipped with a hand wheel 11, extends to the surface at a point near the tank. A casing or vertical wall 12 is arranged around the heating chamber and extends above the same to form the drinking trough 13. The bottom of said trough is formed by a horizontal partition 14 preferably arranged on a level with the top surface of the concrete heating chamber. Intermediate of the bottom and top surfaces of the cover of the heating chamber, I form a horizontal passage 15 extending, preferably, diagonally across said chamber and opening on the outer walls thereof below the partition 14. A central flue 16 extends vertically through the tank, opening at its lower end upon the passage 15 and projecting at its upper end above the tank where it is covered by a suitable cap 17. Water tight joints may be made between the top and bottom of the tank and said flue by pairs of lock-nuts 18. By means of this arrangement, it will be seen that the flames and products of combustion from the burner are obliged to pass out through the front and rear openings 5 and 6 in the walls of the heating chamber into the compartment or space 19 surrounding said chamber and arranged below the drinking trough, and thence through the horizontal passage 15 before they can reach the flue 16. In traveling this tortuous passage, all of the flames are extinguished before they reach the top of the flue so that there is no chance for a fire being started by my apparatus. This object is aided by making the horizontal passage of restricted diameter so that only a small portion of the flames can enter it.

Water is fed from the tank to the drinking trough through a spout 20 provided with a valve 21. The level of the water in the trough is automatically maintained by an air inlet pipe 22 having its lower end terminating just below the brim of the trough and its upper end arranged above the level of the water in the tank. It will be understood that as soon as the level of the water in the trough is lowered, by stock drinking therefrom or in any other manner, until the lower end of the air inlet pipe is exposed, air entering the upper part of the tank, through said pipe, will allow water to flow from the tank into the trough, via the spout 20, until the lower extremity of said air inlet pipe is again closed by the water in the trough whereupon the outflow of the water from the tank to the trough is automatically stopped by the formation of a partial vacuum in the top of the tank. Another spout 23 extends from the tank, through the trough, to the outside of the latter for the purpose of supplying distant yards or barns. This spout has a valve 24 and, like the spout 20, is arranged below the normal level of the water in the trough so that, when the apparatus is in operation in cold weather, said spouts will be kept from freezing up by the warm water surrounding them in the trough.

The tank is preferably provided with a water gage 25. When the water gets low in the tank, it can be replenished from any suitable source of supply, such as a windmill on a farm, by opening the valve 9 in the water supply pipe. When the tank has been filled to the desired level, the water in the supply pipe may be drained off, to prevent freezing, the water being retained in the tank by the check valve 26 arranged in the portion of the supply pipe which extends through the wall of the heating chamber.

It will be observed that in my watering apparatus I have arranged all of the pipes and valves, which are apt to freeze up, either in a heated space or in heated water. My stock tank, therefore, is free from the objection to which most of the devices of this kind now in use are open.

It will be understood, of course, that any other suitable burner may be utilized for heating the apparatus instead of the gas furnished by the pipe shown and described herein.

I do not limit myself to the details of construction disclosed herein but reserve the right to make such changes as fairly fall within the scope of the appended claims.

I claim:

1. A watering apparatus of the character described, provided with a heating chamber having openings in its walls, a water tank superposed upon said chamber, a trough arranged around the lower portion of said tank, a chamber arranged below said trough and surrounding the heating chamber, a flue extending through the tank, and a passage extending from said outer chamber to said flue.

2. A watering apparatus of the character described, provided with a heating chamber having openings in its walls, a water tank superposed upon said chamber, a trough arranged around the lower portion of said tank, a chamber arranged below said trough and surrounding the heating chamber, a flue extending through the tank, and a restricted passage extending from said outer chamber to said flue.

3. A watering apparatus, of the character described, provided with a heating chamber having openings in the front and rear thereof, a water tank superposed upon said chamber, a drinking trough arranged around the lower portion of said tank, a chamber arranged around the heating chamber and below the trough, a flue extending through the tank, and a passage arranged diagonally of the heating chamber through the top thereof and communicating with the flue and the outer chamber below the trough.

In testimony whereof, I affix my signature, in presence of two witnesses.

ULYSUS G. SMITH.

Witnesses:
JOHN J. POMEROY,
OREN BARTON.